United States Patent
Rezac

(10) Patent No.: US 7,813,110 B1
(45) Date of Patent: Oct. 12, 2010

(54) ELECTRICAL ENCLOSURES HAVING CONFIGURABLE PANEL LAYOUTS

(76) Inventor: Willard J. Rezac, 5681 Michael Dr. NE., Cedar Rapids, IA (US) 52411

(*) Notice: Subject to any disclaimer, the term of this patent is extended or adjusted under 35 U.S.C. 154(b) by 36 days.

(21) Appl. No.: 12/419,670

(22) Filed: Apr. 7, 2009

(51) Int. Cl.
  *H02B 1/20* (2006.01)
  *H02B 5/00* (2006.01)

(52) U.S. Cl. .................. 361/624; 361/627; 361/634; 361/637; 361/647; 361/652; 174/68.2; 174/149 B

(58) Field of Classification Search .......... 361/600, 361/601, 622, 624, 627, 630, 631, 634, 636, 361/637, 638, 639, 641, 646, 647, 652, 656, 361/673, 102, 104, 62, 64, 79, 93.1, 645, 361/809; 174/66, 67, 68.2, 148, 149 B, 133 B, 174/171, 129 B, 88 B, 7, 218.2, 43, 157; 324/158.1, 424; 200/43.15, 48 R, 294, 296, 200/306; 439/218, 82, 83, 79, 115, 116, 439/209, 884, 101, 102, 554, 716; 218/2, 218/7, 43, 157

See application file for complete search history.

(56) References Cited

U.S. PATENT DOCUMENTS

| | | | |
|---|---|---|---|
| 2,626,984 A | 1/1953 | Cole | |
| 2,942,157 A | 6/1960 | Davis | |
| 3,375,411 A * | 3/1968 | Mrowka | 361/637 |
| 3,403,301 A * | 9/1968 | Mrowka et al. | 361/635 |
| 3,404,315 A * | 10/1968 | Jacobs et al. | 361/649 |
| 3,411,042 A * | 11/1968 | Klein | 361/636 |
| 4,002,388 A | 1/1977 | Menocal | |
| 4,198,107 A | 4/1980 | Luke et al. | |
| 4,472,761 A * | 9/1984 | Koslosky et al. | 361/638 |
| 4,713,728 A | 12/1987 | Raabe et al. | |
| 5,047,604 A * | 9/1991 | Grass et al. | 200/294 |
| 5,053,584 A | 10/1991 | Chojnowski | |
| 5,134,543 A | 7/1992 | Sharp et al. | |
| 5,535,102 A | 7/1996 | Neill et al. | |
| 5,640,294 A * | 6/1997 | Caggiano et al. | 361/637 |
| 5,894,405 A | 4/1999 | Fleege et al. | |
| 6,416,702 B1 * | 7/2002 | Montague et al. | 264/250 |
| 7,286,340 B2 * | 10/2007 | Karim et al. | 361/647 |

* cited by examiner

*Primary Examiner*—Michael V Datskovskiy

(57) ABSTRACT

An electrical enclosure for circuit breakers includes a busbar with a plurality of apertures equidistantly positioned along a length of the busbar so that insulating inserts and corresponding busbar connectors can be attached to the busbar to receive variously sized circuit breakers having different widths equal to an integer multiple of the center-to-center distance between the equidistantly positioned apertures.

20 Claims, 4 Drawing Sheets

ELECTRICAL ENCLOSURES HAVING CONFIGURABLE PANEL LAYOUTS

FIELD OF THE INVENTION

The present invention relates generally to electrical equipment and, more particularly, to electrical enclosures having configurable electrical panel layouts.

BACKGROUND OF THE INVENTION

Electrical enclosures, such as, for example, a load center, typically house a plurality of circuit breakers and/or related electrical accessories. Load centers are typically prefabricated to accept a fixed number of a fixed type and size of circuit breaker and/or related electrical accessory. There are a variety of manufacturers that produce different types and sizes of circuit breakers and electrical accessories that "plug-into" the load center. Due to the varying shapes and sizes of the circuit breakers from manufacturer to manufacturer, consumers are forced to purchase and install circuit breakers and electrical accessories into a load center specifically designed and manufactured by the same manufacturer as the load center. Moreover, manufacturers produce several different sizes of circuit breakers to accommodate larger or smaller loads (e.g., higher or lower ampacity circuit breakers). For a prefabricated load center having fixed circuit breaker inputs, a consumer is not always able to install differently sized circuit breakers into the load center, even if the circuit breaker is manufactured by the same party that manufactured the load center.

Thus, a need exists for an improved apparatus and method. The present invention is directed to satisfying one or more of these needs and solving other problems.

SUMMARY OF THE INVENTION

The present disclosure is directed to providing a customizable load center (hereinafter referred to as "CLC"). The CLC is configurable by an original equipment manufacturer (herein after referred to as "OEM"), an electrician, an end user, etc. to accept a plurality of different makes, models, sizes, and types of circuit breakers and related electrical accessories. The CLC includes an outer housing for mounting the CLC into a building, such as a residential house. The housing has various inputs/outputs to receive electrical wires. For a CLC in a typical single family home, the housing is mounted between two studs in a wall. The housing receives one or more live electrical lines from an electrical utility company. The live electrical lines electrically couple with one or more electrical busbars. The busbars are insulated from the housing and are rigidly positioned within the housing. The busbars supply electricity to the plurality of circuit breakers and related electrical accessories that are plugged into the CLC.

The present disclosure includes a plurality of insulating inserts that are positioned adjacent to the one or more busbars. The insulating inserts can be coupled to the one or more busbars, to the housing, or to both. The insulating inserts allow an OEM, a retail store, an end-user, etc. to customize the layout of the CLC at any point in time of the life of the CLC to accept a variety of different sizes and types of circuit breakers or related electrical accessories. According to some embodiments, a plurality of insulating inserts are designed for receiving a variety of different makes, types, and sizes of circuit breakers. For example, for a half-inch circuit breaker there is an associated half-inch insulating insert that is configured to be attached onto the busbars and to receive the half-inch circuit breaker therein.

For another example, according to some embodiments, if an OEM desires to customize a CLC to accommodate 5 half-inch circuit breakers, 7 three-quarter-inch circuit breakers, and 8 one-inch circuit breakers, then the OEM simply positions 5 half-inch insulating inserts, 7 three-quarter-inch insulating inserts, and 8 one-inch insulating inserts into the housing and adjacent to the one or more busbars. The insulating inserts can be designed to "snap" into connection with the busbars and/or the housing. After the insulating inserts are positioned within the housing, one or more busbar connectors can be attached to the busbars. The variously sized insulating inserts provide a variety of differently sized circuit breaker mountings such that an OEM or end user can mix and match various circuit breakers and electrical accessories that have quarter, half, three-quarter, one-inch, etc. thicknesses.

According to some embodiments a customizable load center includes a housing, a first busbar, a second busbar, a plurality of insulating inserts, and a plurality of busbar connectors. The first busbar has a plurality of apertures equidistantly positioned along a length of the first busbar. The second busbar has a plurality of apertures equidistantly positioned along a length of the second busbar. The distance between the equidistantly positioned apertures of the first busbar are equal to the distance between the equidistantly positioned apertures of the second busbar. The first and the second busbars are positioned within the housing. The plurality of insulating inserts each has a body with a removable portion. The removable portion is configured to be removed from the body to form an aperture therein. Each of the insulating inserts has a width that is an integer multiple of the distance between the equidistantly positioned apertures. Each of the insulating inserts is positioned adjacent to the first and the second busbars. The plurality of busbar connectors each has a first end and a second end. The first end of each of the busbar connectors is configured to be coupled to one of the equidistantly positioned apertures through the aperture formed in the body. The second end of each of the busbar connectors is configured to receive a jaw member of a first circuit breaker.

According to some embodiments, an electrical enclosure includes a busbar, an insulating insert, and a busbar connector. The busbar has a plurality of apertures equidistantly positioned along a length of the busbar. The insulating insert has a body with a removable portion. The removable portion is configured to be removed from the body to form an aperture therein. The insulating insert has a width that is an integer multiple of the distance between the equidistantly positioned apertures. The first insulating insert is positioned adjacent to the busbar. The busbar connector has a first end and a second end, the first end being configured to be coupled to one of the equidistantly positioned apertures through the aperture formed in the body. The second end of the busbar connector is configured to receive a jaw member of a first circuit breaker.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
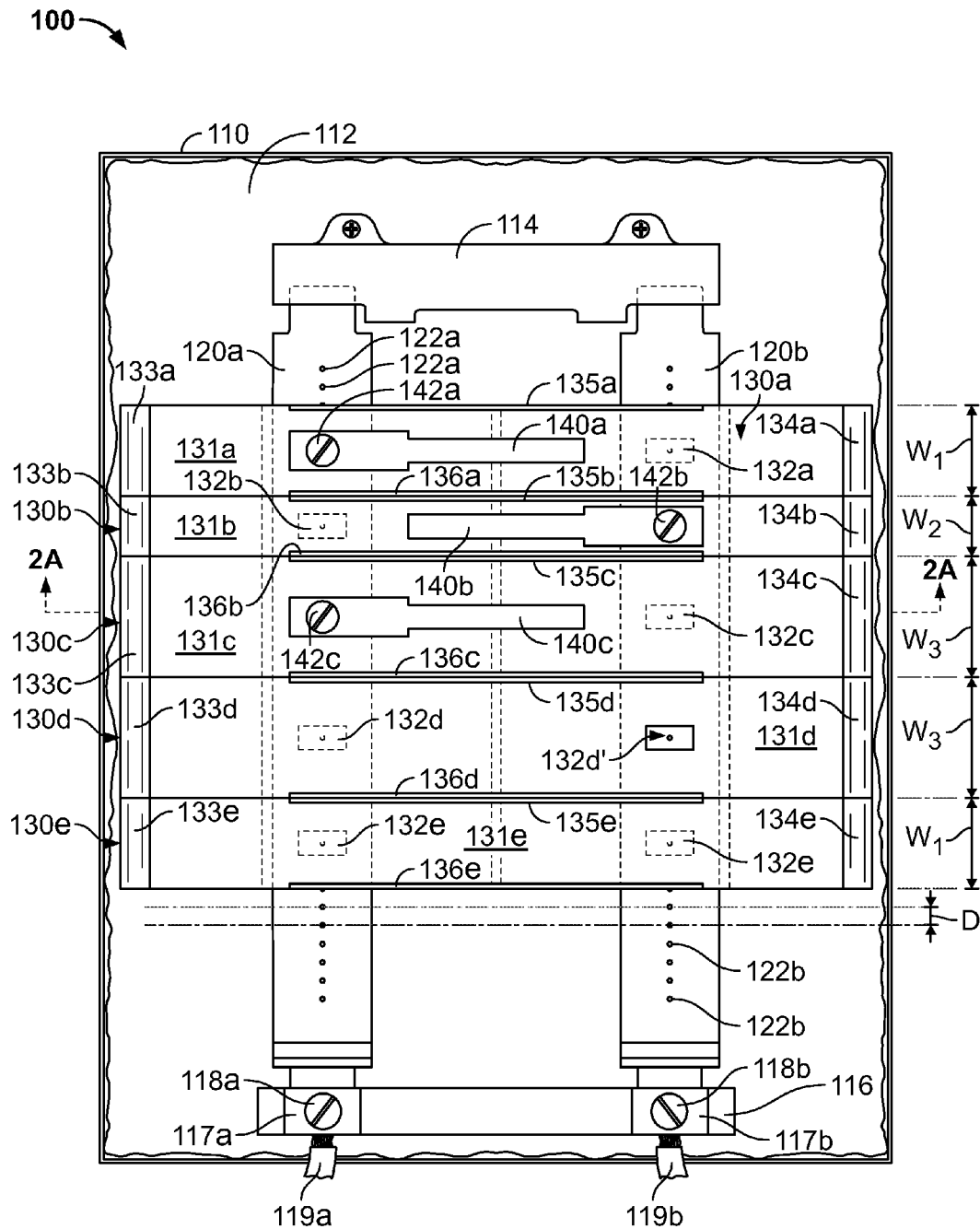
FIG. 1 is a top view of an electrical enclosure according to some aspects of the present disclosure.

Referring to FIG. 1, an electrical enclosure or customizable load center 100 is shown according to some embodiments of the present disclosure. The customizable load center 100 is referred to herein as CLC 100 for short. According to some embodiments, the CLC 100 includes a housing 110. The housing 110 can be made of a variety of materials including metal, plastic, fiberglass, etc. According to some embodiments, the housing 110 includes a hinged door (not shown) or other means of sealing or covering the contents of the CLC 100. The housing 110 can also include an insulating sheet or pad 112 to cover all of or a portion of an interior of the housing 110. The insulating pad 112 is configured to electrically insulate the contents of the CLC 100 from items outside the housing 110 (e.g., metal wall studs, screws, wires, etc.).

According to some embodiments, the housing 110 is configured to be installed or attached between two wall studs in a building or residential house. The width of the housing 110 is limited to an inner spacing between the wall studs (e.g., about 14.5 inches±2 inches or about 18 inches±2 inches). Such a width limitation can affect the design and overall dimensions of the housing 110, which in return affects the number of circuit breakers and/or related electrical accessories that can be coupled within the housing 110. For example, when the outer width of the housing 110 is designed to fit between two wall studs that are positioned, for example, sixteen inches on center, the number of average-sized circuit breakers that can be coupled side-to-side across the width of the housing 110 is limited to about two average-sized circuit breakers. As additional electrical and mechanical parts and/or components are included into circuit breaker housings, the thicknesses of the circuit breaker housings can vary. Thus, the CLC 100 of the present disclosure is configurable to accept a plurality of differently sized circuit breakers and/or related electrical accessories.

The CLC 100 includes a first and a second busbar 120a-b, a plurality of insulating inserts 130a-e, and a plurality of busbar connectors 140a-c. While specific numbers of busbars 120a-b, insulating inserts 130a-e, and busbar connectors 140a-c are shown in FIG. 1, it is contemplated that the CLC 100 can include any number or amount of busbars 120, insulating inserts 130, and busbar connectors 140. For example, in some embodiments, the CLC 100 includes one busbar 120, one insulating insert 130, and one busbar connector 140. For another example, the CLC 100 includes three busbars 120, twenty insulating members 130, and fifteen busbar connectors 140.

The first and the second busbars 120a-b are formed from any electrical conducting material, as is known in the art, such as copper. The busbars 120a-b are positioned within the housing 110 such that the busbars 120a-b are electrically insulated from the housing 100. According to some embodiments, the busbars 120a-b are positioned between and held rigidly in place by a first block 114 and a second block 116. The first and the second blocks 114 and 116 are attached or coupled to the housing 110 and/or the insulating pad 112 such that the first and the second blocks 114 and 116 aid in electrically insulating the busbars 120a-b from the housing 110. The second block 116 includes a first terminal 117a and a second terminal 117b. The housing 110 includes one or more apertures (not shown) positioned adjacent to the terminals 117a-b and configured to receive electrical supply lines 119a-b. The first and the second terminals 117a-b include respective attachment means, such as, for example, a lug, screw, or bolt 118a-b to aid in the electrical and physical attachment of the electrical supply wires 119a-b. The electrical supply wires 119a-b are electrically and physically coupled with the respective terminals 117a-b via the screws 118a-b to supply electricity to the first and the second busbars 120a-b, respectively. Various other methods of positioning the busbars 120a-b within the housing 110 and electrically coupling the busbars 120a-b to the supply wires 119a-b are contemplated.

The first busbar 120a includes a plurality of apertures 122a equidistantly positioned along a length of the first busbar 120a. Similarly, the second busbar 120b includes a plurality of apertures 122b equidistantly positioned along a length of the second busbar 120b. The distance, D, between the apertures 122a positioned along the length of the first busbar 120a and the distance, D, between the apertures 122b positioned along the second busbar 120b are equal. For example, the distance, D, from the center of one aperture to the center of an immediately adjacent aperture on the first busbar 120a is equal to the distance, D, from the center of one aperture to the center of an immediately adjacent aperture on the second busbar 120b, as shown in FIG. 1. According to other embodiments, a distance between the apertures 122a positioned along the length of the first busbar 120a is an integer multiple of a distance between the apertures 122b positioned along the second busbar 120b. According to still other embodiments, a distance between the apertures 122b positioned along the length of the second busbar 120a is an integer multiple of a distance between the apertures 122a positioned along the first busbar 120b.

The apertures 122a-b can be circular, oval, square, rectangular, or any other consistent shape from aperture to aperture. Alternately, the apertures can be elongated slots (not shown) having a length and a width, wherein the length of the slots is positioned either parallel to the length of the busbars 120a-b or perpendicular to the length of the busbars 120a-b. In this example, the slots are positioned such that at least a portion of the busbars 120a-b is formed in the shape of a comb (not shown). Alternately, instead of the plurality of apertures 122a-b, the busbars 120a-b each include a plurality of equidistantly positioned attachment surfaces or areas, registration positions, dimples, divots, channels, cavities, lumps, indents, etc.

Figure 2A:
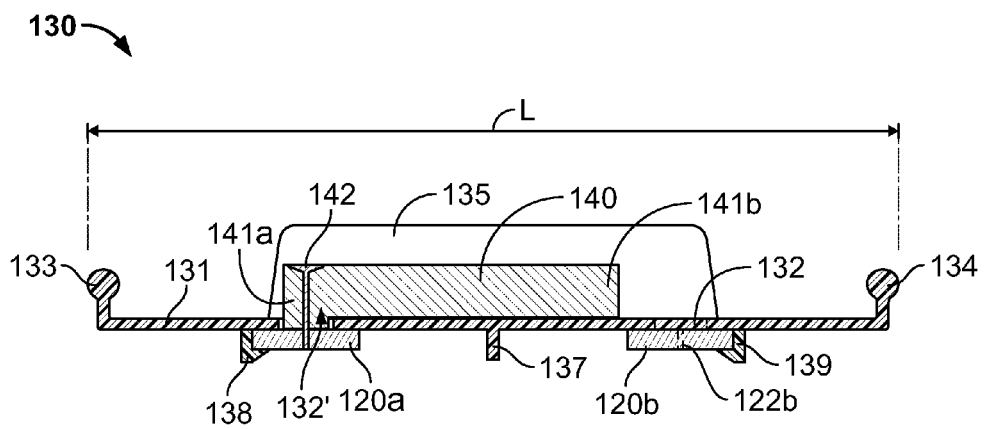
FIG. 2A is a cross-sectional side elevation view of an insulating insert of the electrical enclosure of FIG. 1 according to some aspects of the present disclosure.

Now referring to FIGS. 1 and 2A, each of the plurality of insulating inserts 130a-e is configured to be positioned within the housing 110 and adjacent to the busbars 120a-b. Each of the insulating inserts 130a-e is configured to be coupled to the first busbar 120a, to the second busbar 120b, or to both busbars 120a-b. Alternatively, each of the insulating inserts 130a-e can be configured to be coupled to the housing 110, the insulating pad 112, and/or the busbars 120a-b.

Each of the plurality of insulating inserts 130a-e includes a body 131a-e. The body 131a-e can be formed from any electrically insulating material, such as, for example, plastic. The body 131a-e can be formed as a single integrated part or a collection of parts. For example, the body 131a-e can be formed via a molding process, an extrusion process, or a combination thereof. Each of the bodies 131a-e has a length, L and a width, W. The length, L of each of the insulating inserts 130a-e is the same from insert to insert. Alternately, the length, L can vary from insert to insert (not shown). Likewise, the width, W of each of the insulating inserts 130a-e can vary from insert to insert. As shown in FIG. 1, the plurality of insulating inserts 130a-e include insulating inserts having at least three different widths, $W_1$, $W_2$, and $W_3$. By way of example, $W_1$ is three-quarters of an inch, $W_2$ in half an inch, and $W_3$ is one inch. It is contemplated that the plurality of insulating inserts 130a-e can include insulating inserts having a variety of other or additional widths, such as, for example, one-sixteenth of an inch, one-eighth of an inch, one-third of an inch, two-thirds of an inch, two inches, or corresponding metric units, etc. The available widths, W of the insulating inserts 130a-e correspond to widths of circuit breakers and related electrical accessories available for attachment to the CLC 100.

The width, W of each of the plurality of insulating inserts 130 is an integer multiple of the distance, D between the equidistantly positioned apertures of the first busbar 120a, the second busbar 120b, or both the first and the second busbars 120a-b. For example, for a distance, D of one-eighth of an inch between the apertures 122a-b positioned along the first and the second busbars 120a-b, the width, W of the insulating inserts can be one-eight of an inch, one-quarter of an inch, half of an inch, three-quarters of an inch, one inch, two inches, etc. A distance, D of one-eighth of an inch allows for side-by-side positioning of the plurality of insulating inserts 130a-e having distinct integer multiple widths along the length of the busbars 120a-b.

The body 131 further includes a divider 137. The divider 137 is positioned to aid in electrically insulating the first busbar 120a from the second busbar 120b. The divider 137 can be positioned such that a bottom surface of the divider 137 rests on or contacts the insulating pad 112. The divider 137 further provides rigidity to the insulating insert 130. The divider 137 can be formed as an integral portion of the body 131 or as a separate part coupled thereto.

The insulating insert 130 further includes coupling means 138 and 139. As shown in FIG. 2A, the first coupling means 138 and the second coupling means 139 are both resilient hooks or clips. The resilient clips 138,139 are configured to bend and snap onto and around the busbars 120a-b to removably couple the insulating insert 130 to the busbars 120a-b. For example, an OEM configuring the CLC 100 can position the insulating insert 130 above the busbars 120a-b and press the insulating insert 130 into contact with the busbars 120a-b such that the resilient clips 138,139 bend outward and snap into place around the busbars 120a-b, thereby holding the insulating insert 130 in position adjacent to the busbars 120a-b. To remove the insulating insert 130, the resilient clips 138,139 can be bent outward while pulling the insulating insert 130 away from the busbars 120a-b.

Figure 2B:
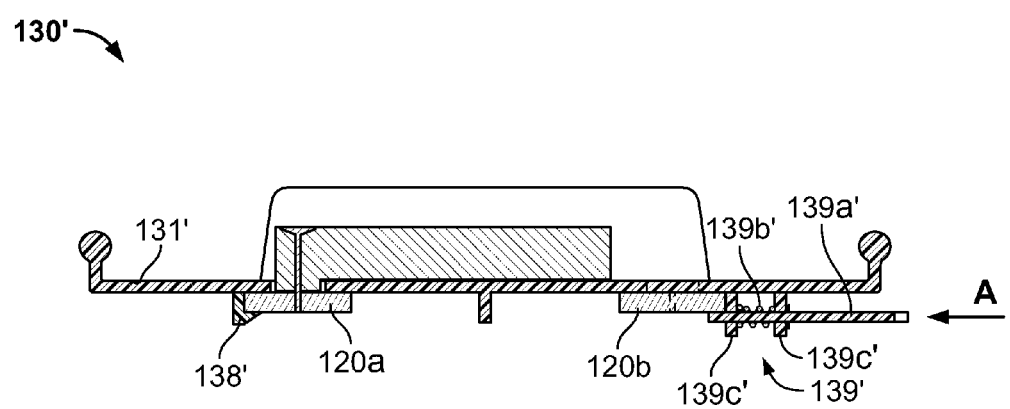
FIG. 2B is a cross-sectional side elevation view of an insulating insert according to other aspects of the present disclosure.

Referring to FIG. 2B, an alternative apparatus and method of coupling and de-coupling an insulating insert 130' is shown and described. As shown in FIG. 2B, the insulating insert 130' includes a body 131' and coupling means 138' and 139'. The first coupling means 138' is the same as, or similar to, the first coupling means 138 of FIG. 2A. The second coupling means 139' includes a pin 139a', a spring 139b', and a support structure 139c'. The pin 139a' is supported by and moveably attached to the support structure 139c'. The spring 139b' is positioned within the support structure 139c' to bias the pin 139a' in the direction of arrow A to secure the insulating insert 130' in a locked positioned (shown). To remove the insulating insert 130' from the locked position, the pin 139a' is pulled in a direction opposite to the direction of arrow A, thereby freeing the insulating insert 130' for removal. Various other methods and apparatuses for coupling and decoupling the insulating inserts 130 and 130' to the busbars 120a-b and/or the housing 110 are contemplated.

Referring back to FIGS. 1 and 2A, the plurality of insulating inserts 130a-e each includes one removable portion 132. Alternately, as shown in FIG. 1, the plurality of insulating inserts 130a-e each include two removable portions 132 (e.g., removable portions 132a,b,c,d,e). The removable portions 132 are configured to be removed from the body 131 of the respective insulating inserts 130a-e to form apertures 132' in the body 131. The formed apertures 132' can be of a variety of shapes and sizes including, square, rectangle, circular, oval, etc. For example, the insulating insert 130d is shown as having one of the removable portions 132d intact and the other removable portion removed from the body 131d, thereby forming a rectangular aperture 132d'. The rectangular aperture 132d' formed in the body 131d allows access to the underlying busbar 120b for physical and electrical attachment of one of the busbar connectors 140.

The removable portions 132 are cut-out sections configured to be snapped-off of the body 131. The removable portions 132 can be pre-stressed and/or pre-cut to facilitate removal from the body 131. The removable portions 132 are sufficiently attached to the body 131 to prevent accidental removal of the removable portion 132. In such examples, a piece of tape can be used to further maintain the removable portion's 132 attachment to the body 131.

Each of the plurality of insulating inserts 130a-e optionally includes a first mounting rail 133 and a second mounting rail 134. The mounting rails 133, 134 can be formed as an integral portion of the body 131 or as an independent parts coupled thereto. The mounting rails 133, 134 can be made of plastic and/or metal. The mounting rails 133, 134 are positioned to receive respective mounting clips of two different circuit breakers attached to the insulating insert 130, described below and shown in FIGS. 3 and 4. The mounting rails 133, 134 provide additional support and/or attachment rigidity of the circuit breakers to the insulating inserts 130a-e. The mounting rails 133, 134 aid in aligning and/or positioning respective jaw members of the two circuit breakers with the busbar connector 140, also described below and shown in connection with FIGS. 3 and 4. While the insulating members 130a-e are each shown as including the mounting rails 133a-e, 134a-e, it is contemplated that the insulating inserts 130a-e do not necessarily include the mounting rails 133a-e, 134a-e. In such embodiments, the circuit breakers can be designed to merely attach to the busbar connectors 140, or the circuit breakers can be configured to attach to the housing 110, which can include mounting rails similar to the mounting rails 133 and 134.

Each of the plurality of insulating inserts 130 further includes a first phase barrier 135 and a second phase barrier 136. The first phase barrier 135 extends away from a first side of the body 131 and the second phase barrier 136 extends away from a second opposing side of the body 131, as shown in FIG. 1. The phase barriers 135 and 136 can be formed as an integral portion of the body 131 or as independent parts coupled thereto. The phase barriers 135 and 136 can be made of any electrically insulating material, such as, for example, plastic. Generally, the phase barriers 135 and 136 are positioned to insulate a first circuit breaker from a second circuit breaker attached within or coupled to the CLC 100. The phase barriers 135 and 136 insulate a first jaw member of a first circuit breaker from a second jaw member of a second circuit breaker when the second circuit breaker is positioned adjacent to the first circuit breaker within the CLC 100. For example, the second phase barrier 136a and the first phase barrier 135b are positioned to insulate a first circuit breaker coupled to first insulating insert 130a and the first busbar connector 140a from a second circuit breaker coupled to the second insulating insert 130b and the second busbar connector 140b. For another example, the second phase barrier 136b and the first phase barrier 135c are positioned to insulate a first circuit breaker coupled to the second insulating insert 130b and the second busbar connector 140b from a second circuit breaker coupled to the third insulating insert 130c and the third busbar connector 140c.

As described above, removal of the removable portion 132 from the insulating insert 130 provides access to the underlying busbar 120a-b for attachment of one of the busbar connectors 140. Each of the plurality of busbar connectors 140a-c has a first end 141a and a second end 141b, as shown in FIG. 2A. The first end 141a is configured to be coupled to the first or the second busbar 120a-b via one of the apertures 122a-b, respectively. The busbar connector 140 is physically and electrically coupled to the first busbar 120a through the aperture 132' formed in the insulating insert 130 using an attachment means 142a-c. As shown in FIG. 2A, the attachment means 142 can be a self-tapping screw, a regular screw, a bolt, etc. The attachment means 142 secures the busbar connector 140 to the first busbar 120a such that the second end 141b is configured to receive and/or be coupled to one or more jaw members of one or more circuit breakers, which is described below in reference to FIGS. 3 and 4.

As shown in FIG. 1, the busbar connectors 140a-c alternate couplings between the first and second busbars 120a-b. Such a configuration can be used to equally distribute a load between the busbars 120a-b. Other coupling configurations are contemplated. The busbar connectors 140 are shown as having an "L" shape. Other shapes are contemplated, such as, for example, a "Z" shape, a "T" shape, etc.

Figure 3:
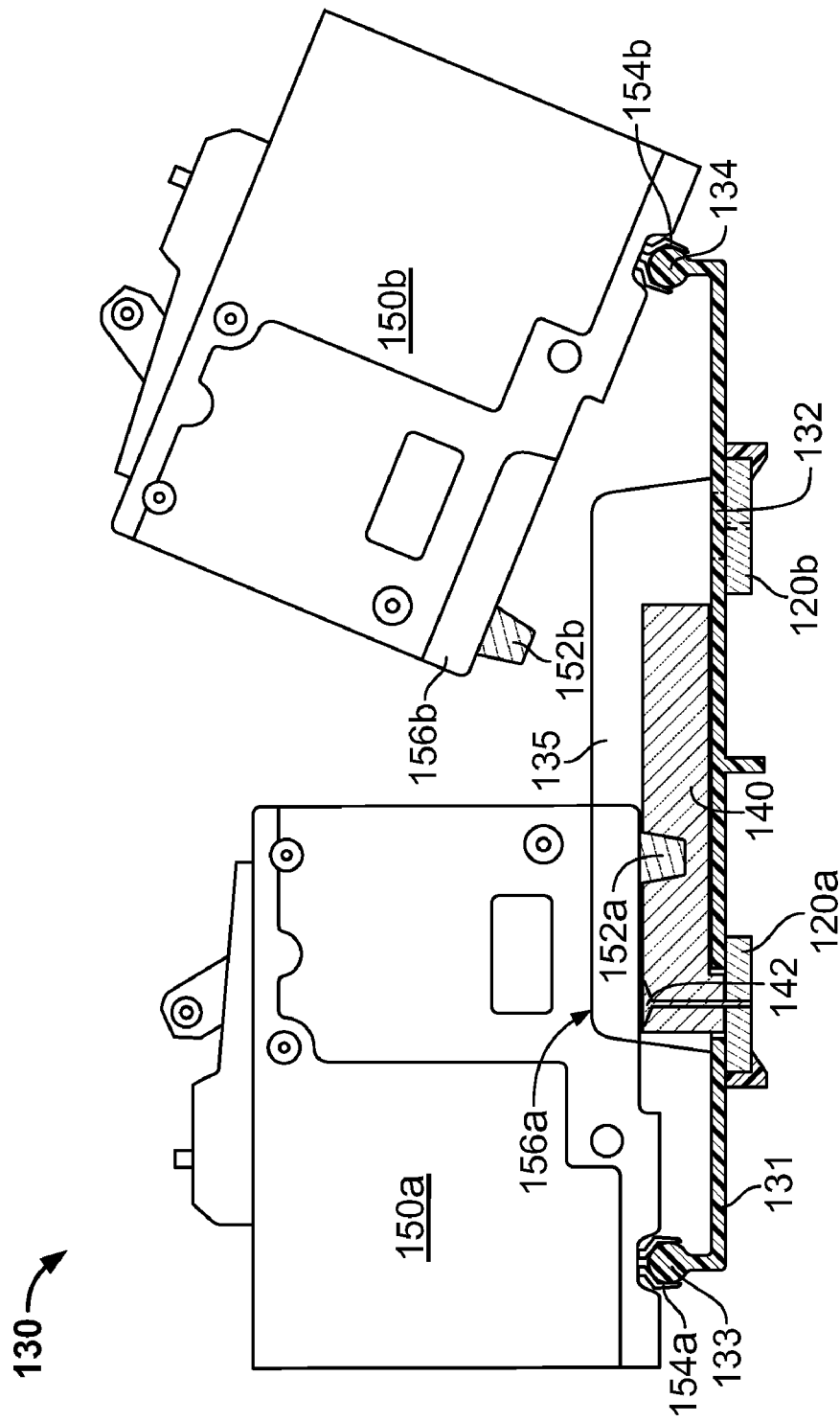
FIG. 3 is a partial cross-sectional side elevation view of the insulating insert of FIG. 2A at least partially coupled with two circuit breakers according to some aspects of the present disclosure.

Now referring to FIG. 3, the insulating insert 130 of FIG. 2A is shown with a first circuit breaker 150a and a second circuit breaker 150b at least partially attached. The circuit breakers 150a-b are not shown in cross section for illustrative purposes to show how the first and the second circuit breakers 150a-b attach to the busbar connector 140. The circuit breakers 150a-b each includes a jaw member 152a-b, a mounting clip 154a-b, and a pair of phase barrier recesses 156a-b, one recess being on a first side (shown) of each circuit breaker 150a-b and the other recess being on a second opposing side (not shown) of each circuit breaker 150a-b.

Referring to the second circuit breaker 150b, attachment of the second circuit breaker 150b to the insulating insert 130 begins by attaching the second mounting clip 154b onto the second mounting rail 134. Then the second circuit breaker 150b can be rotated to attach the second jaw member 152b to the busbar connector 140. As the second circuit breaker 150b is rotated, the second recess 156b that is on the second opposing side of the second circuit breaker 150b (not shown) is positioned to accept and/or register with the first phase barrier 135. Referring to the first circuit breaker 150a, the first circuit breaker 150a is shown in the attached or connected position, such that (i) the mounting clip 154a is attached to the first mounting rail 133, (ii) the jaw member 152a is attached to the busbar connector 140, and (iii) the first recess 156a that is on the second opposing side of the first circuit breaker 150a (not shown) is completely registered with the first phase barrier 135.

Figure 4:
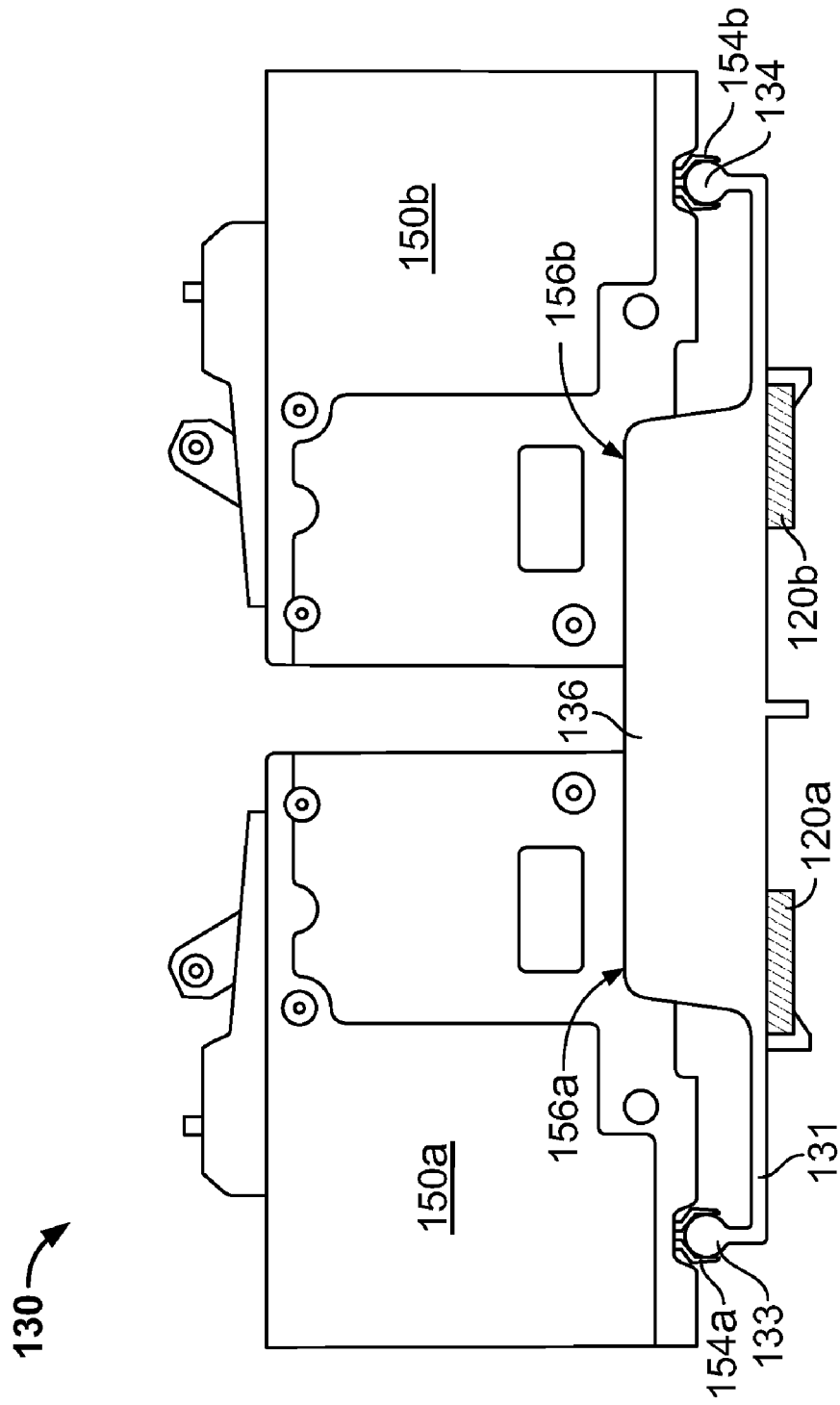
FIG. 4 is a side elevation view of the insulating insert of FIG. 2A fully coupled with two circuit breakers according to some aspects of the present disclosure.

Now referring to FIG. 4, a side elevation view of the insulating insert 130 of FIG. 2A is shown with the first circuit breaker 150a and the second circuit breaker 150b attached. FIG. 4 is similar to FIG. 3, but the second phase barrier 136 is shown in the elevation view to illustrate how the first and the second recesses 156a-b that are on the respective first sides of the first and the second circuit breakers 150a-b accept and/or register with the second phase barrier 136. As shown, the second phase barrier 136 electrically insulates the first and the second jaw members 152a-b from potentially adjacent jaw members of other circuit breakers within the CLC 100.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A customizable load center, comprising:
   a housing;
   a first busbar having a plurality of apertures equidistantly positioned along a length of the first busbar;
   a second busbar having a plurality of apertures equidistantly positioned along a length of the second busbar, the first and the second busbars being positioned within the housing;
   a plurality of insulating inserts each having a body with a removable portion, the removable portion configured to be removed from the body to form an aperture therein, each of the insulating inserts having a width that is an integer multiple of the distance between the equidistantly positioned apertures of the first busbar, each of the insulating inserts being positioned adjacent to the first and the second busbars; and
   a plurality of busbar connectors, each of the busbar connectors having a first end and a second end, the first end of each of the busbar connectors being configured to be coupled to one of the equidistantly positioned apertures through the aperture formed in the body, the second end of each of the busbar connectors being configured to receive a jaw member of a first circuit breaker.

2. The customizable load center of claim 1, wherein one of the busbar connectors is coupled through the aperture formed in the body of one of the insulating inserts to one of the equidistantly positioned apertures of the first busbar such that coupling the jaw member of the first circuit breaker to the second end of the busbar connector electrically connects the first circuit breaker to the first busbar.

3. The customizable load center of claim 2, wherein the second end of the busbar connector is configured to receive a second jaw member of a second circuit breaker such that the first and the second circuit breakers are electrically connected to the first busbar.

4. The customizable load center of claim 3, wherein each of the insulating inserts further includes a first and a second mounting rail, the first mounting rail extending away from a first end of the body and the second mounting rail extending away from a second opposing end of the body, the first mounting rail of the one of the insulating inserts being configured to receive a mounting clip of the first circuit breaker and the second mounting rail of the one of the insulating inserts being configured to receive a mounting clip of the second circuit breaker, the mounting clips for securing the first and the second circuit breakers to the one of the insulating inserts.

5. The customizable load center of claim 1, wherein each of the insulating inserts further includes a first and a second phase barrier, the first phase barrier extending away from a first side of the body and the second phase barrier extending away from a second opposing side of the body.

6. The customizable load center of claim 5, wherein the bodies of the insulating inserts are positioned adjacent to each other such that the first and the second phase barriers are positioned to electrically insulate the jaw member of the first circuit breaker from a jaw member of a third circuit breaker coupled to one of the adjacent insulating inserts.

7. The customizable load center of claim 1, wherein each of the insulating inserts is configured to be coupled to the first and the second busbars, to the housing, or to both.

8. The customizable load center of claim 1, wherein the removable portion includes a first cut-out section configured to be snapped off of the body and a second cut-out section configured to be snapped off of the body, the first cut-out section being positioned adjacent a first end of the body and the second cut-out section being positioned adjacent a second opposing end of the body.

9. The customizable load center of claim 1, wherein the plurality of insulating inserts includes a first insulating insert having an outer width dimension of about 0.75 inches and a second insulating insert having an outer width dimension of about 1 inch.

10. The customizable load center of claim 1, wherein the center-to-center distance between the equidistantly positioned apertures of the first busbar and of the second busbar is equal to an integer multiple of $1/16$ inches.

11. The customizable load center of claim 1, wherein the distance between the equidistantly positioned apertures of the first busbar is equal to the distance between the equidistantly positioned apertures of the second busbar.

12. An electrical enclosure, comprising:
a busbar having a plurality of apertures equidistantly positioned along a length of the busbar;
a first insulating insert having a body with a removable portion, the removable portion configured to be removed from the body to form an aperture therein, the first insulating insert having a width that is an integer multiple of the distance between the equidistantly positioned apertures, the first insulating insert being positioned adjacent to the busbar; and
a busbar connector having a first end and a second end, the first end being configured to be coupled to one of the equidistantly positioned apertures through the aperture formed in the body, the second end of the busbar connector being configured to receive a jaw member of a first circuit breaker.

13. The customizable load center of claim 12, further comprising a housing, the busbar being positioned within and the housing and electrically insulated from the housing, the first insulating insert being configured to be coupled to the busbar, to the housing, or to both.

14. The customizable load center of claim 12, further comprising a second insulating insert having a body, the second insulating insert having a width that is an integer multiple of the distance between the equidistantly positioned apertures, the width of the second insulating insert being distinct from the width of the first insulating insert, the second insulating insert being positioned adjacent to the busbar.

15. The customizable load center of claim 14, wherein body of the first insulating insert is positioned adjacent to the body of the second insulating insert along the busbar.

16. The customizable load center of claim 15, wherein the busbar connector is coupled through the aperture formed in the body of the first insulating insert to one of the equidistantly positioned apertures of the busbar such that coupling the jaw member of the first circuit breaker to the second end of the busbar connector electrically connects the first circuit breaker to the busbar.

17. The customizable load center of claim 16, wherein the second end of the busbar connector is configured to received a second jaw member of a second circuit breaker such that the first and the second circuit breakers are electrically connected to the busbar.

18. The customizable load center of claim 17, wherein the first insulating insert further includes a first and a second mounting rail, the first mounting rail extending away from a first end of the body and the second mounting rail extending away from a second opposing end of the body, the first mounting rail being configured to receive a mounting clip of the first circuit breaker and the second mounting rail being configured to receive a mounting clip of the second circuit breaker, the mounting clips securing the first and the second circuit breakers to the first insulating insert.

19. The customizable load center of claim 18, wherein the first and the second insulating inserts each further includes a first and a second phase barrier, the first phase barriers extending away from a first side of the respective bodies and the second phase barriers extending away from a second opposing side of the respective bodies.

20. The customizable load center of claim 19, wherein the first and the second phase barriers are positioned such that the second phase barrier of the first insulating insert and the first phase barrier of the second insulating insert electrically insulate the jaw member of the first circuit breaker from a jaw member of a third circuit breaker coupled to the second insulating insert.

* * * * *